Feb. 15, 1966 J. CHUBBUCK 3,234,911
TIME CONTROLLED FEEDER
Filed Dec. 10, 1963 6 Sheets-Sheet 2

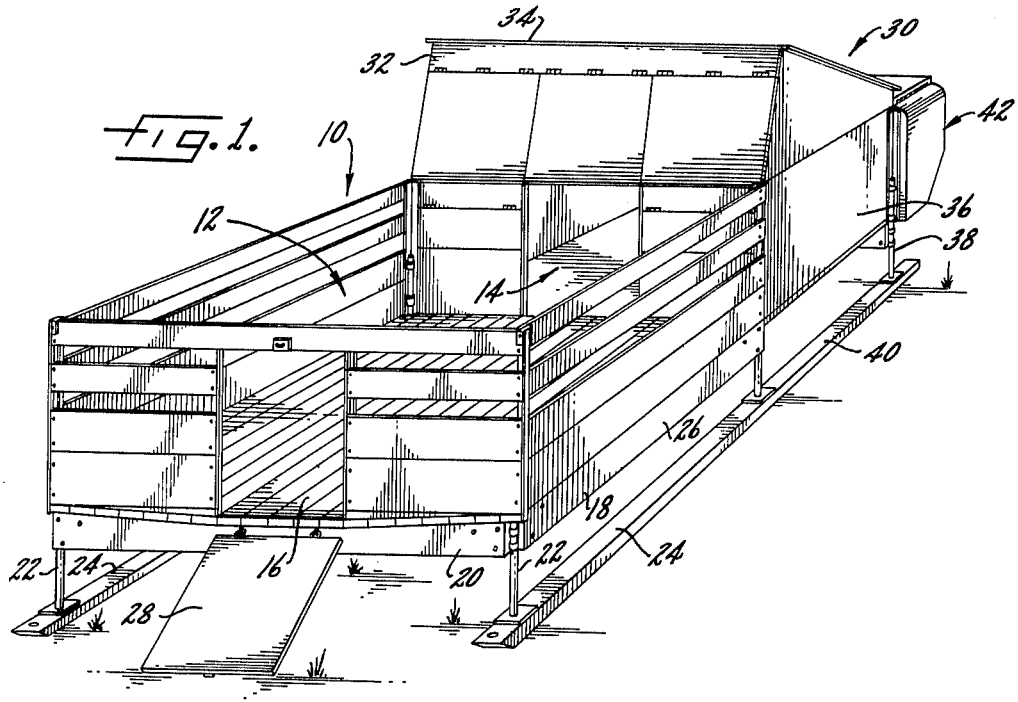

INVENTOR.
Judson Chubbuck,
BY
Parker & Carter
Attorneys.

Feb. 15, 1966 J. CHUBBUCK 3,234,911
TIME CONTROLLED FEEDER
Filed Dec. 10, 1963 6 Sheets-Sheet 3

INVENTOR.
Judson Chubbuck,
BY Parker & Carter
Attorneys.

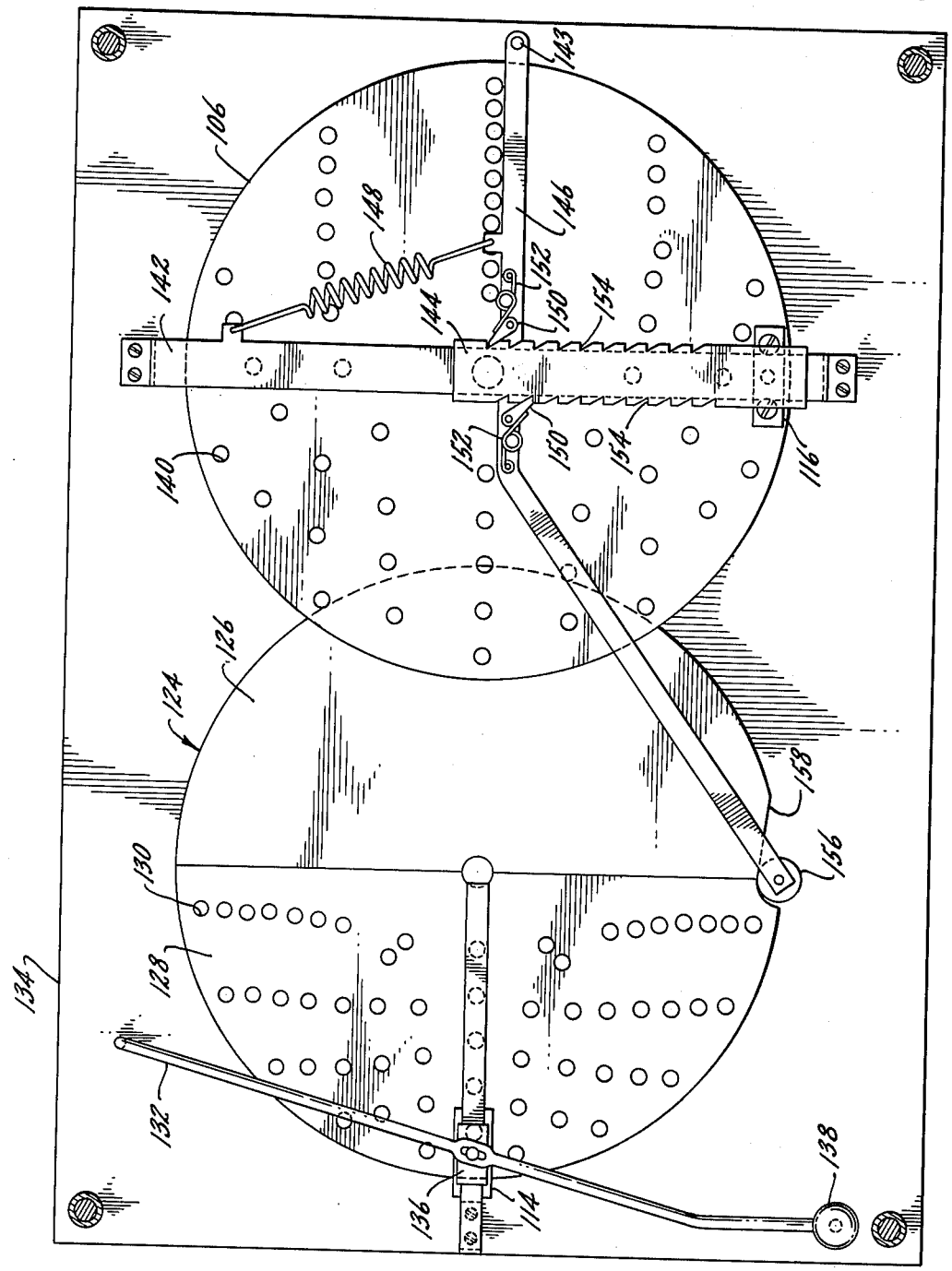

Feb. 15, 1966  J. CHUBBUCK  3,234,911
TIME CONTROLLED FEEDER
Filed Dec. 10, 1963  6 Sheets-Sheet 6

INVENTOR.
Judson Chubbuck,
BY Parker & Carter
Attorneys.

United States Patent Office 3,234,911
Patented Feb. 15, 1966

3,234,911
TIME CONTROLLED FEEDER
Judson Chubbuck, R.R. 1, Le Roy, Ill.
Filed Dec. 10, 1963, Ser. No. 329,502
9 Claims. (Cl. 119—51.11)

This invention relates to an animal feed pen and in particular to a feeder for use thereon.

A primary purpose of the invention is an automatic feeding mechanism for use on a swine feed pen.

Another purpose is a portable feed pen, particularly useful for farrowing and feeding swine.

Another purpose is a proportioning feeder of the type described which automatically proportions feed supplements to the basic grain diet and automatically moves the feed into a trough at predetermined intervals.

Another purpose is a proportioning feeder which can vary the amount of feed supplements added to the grain.

Another purpose is a proportioning feeder of the type described which can automatically vary the amount of feed provided in successive days.

Another purpose is a proportioning feeder of the type described which can vary the number of feed intervals per day.

Other purposes will appear in the ensuing specification, drawings and claims.

Figure 3:
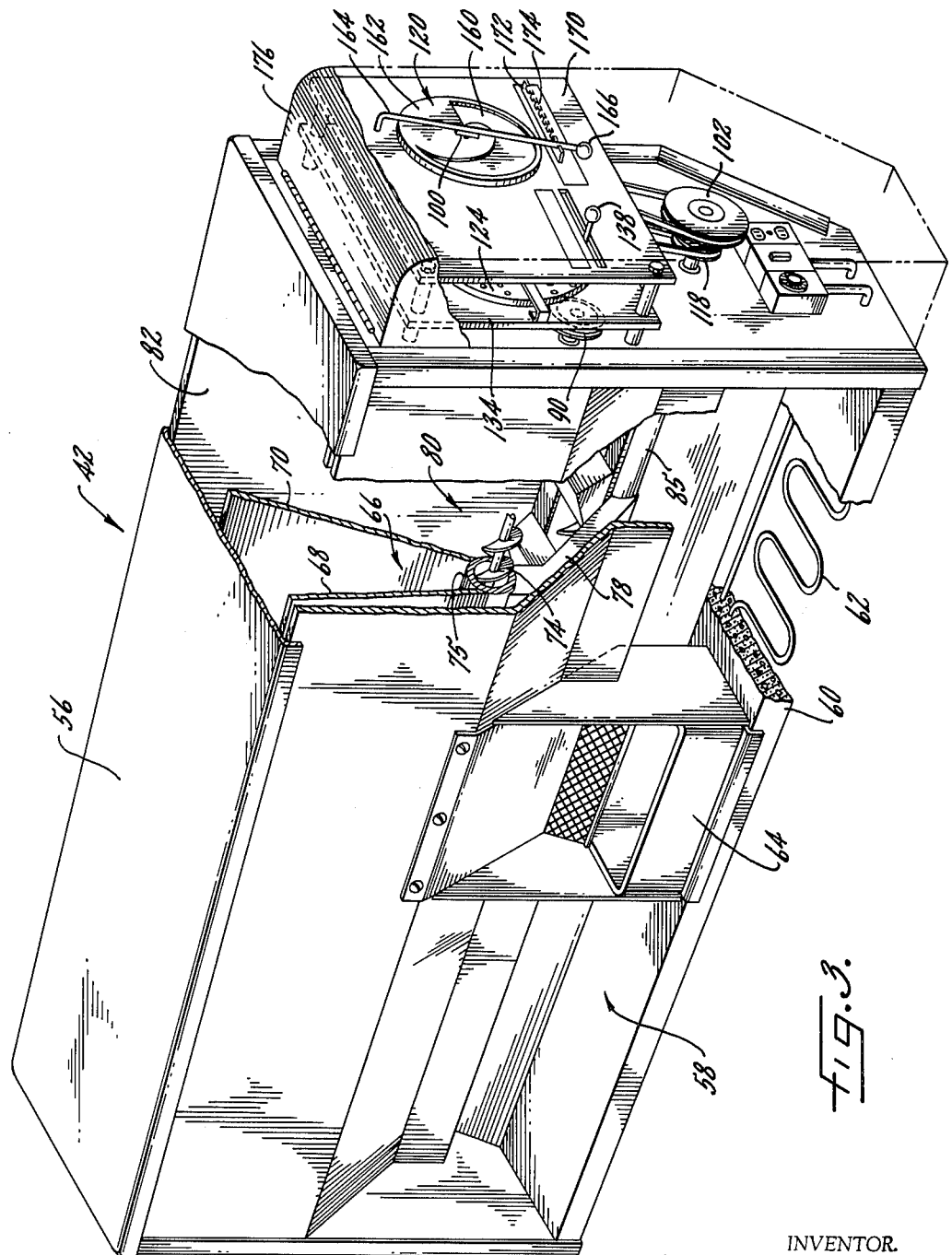
Figure 4:
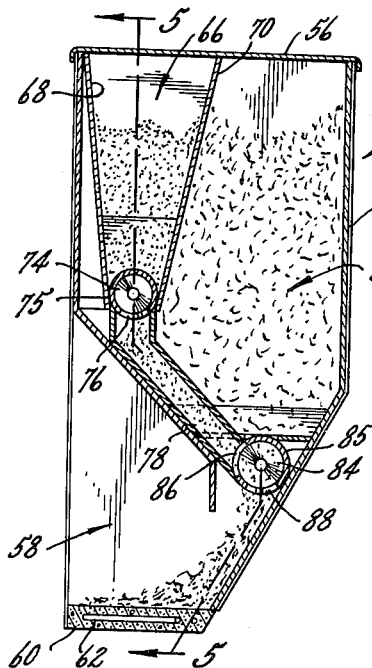
Figure 6:
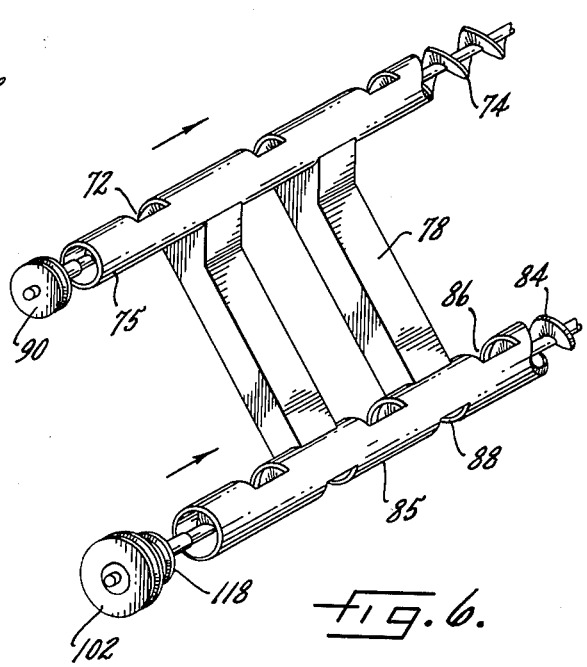
Figure 5:
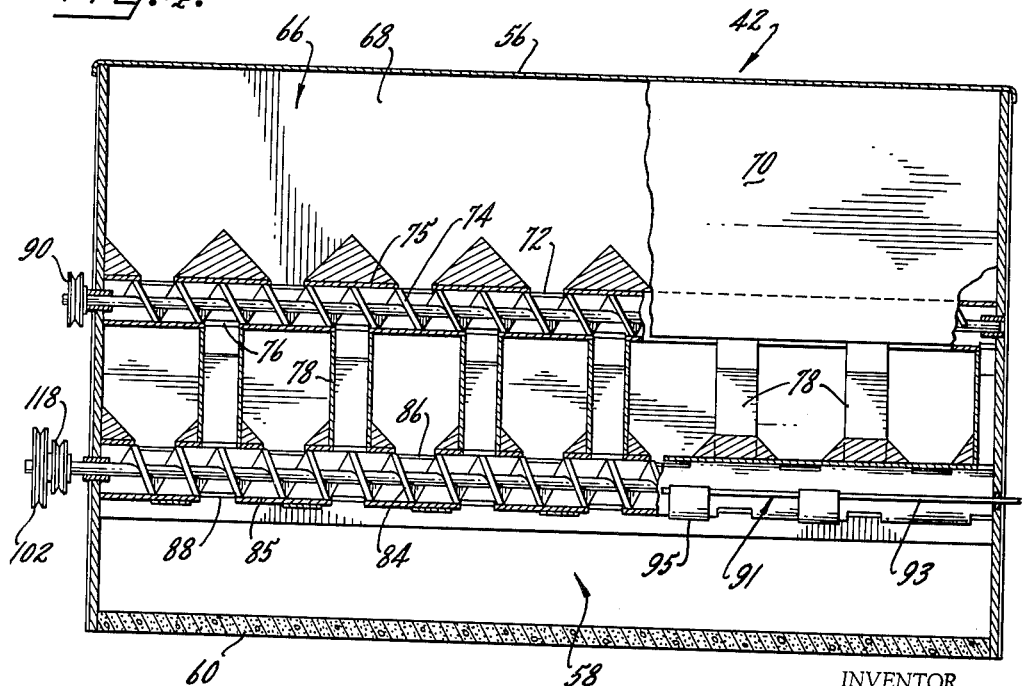
Figure 8:
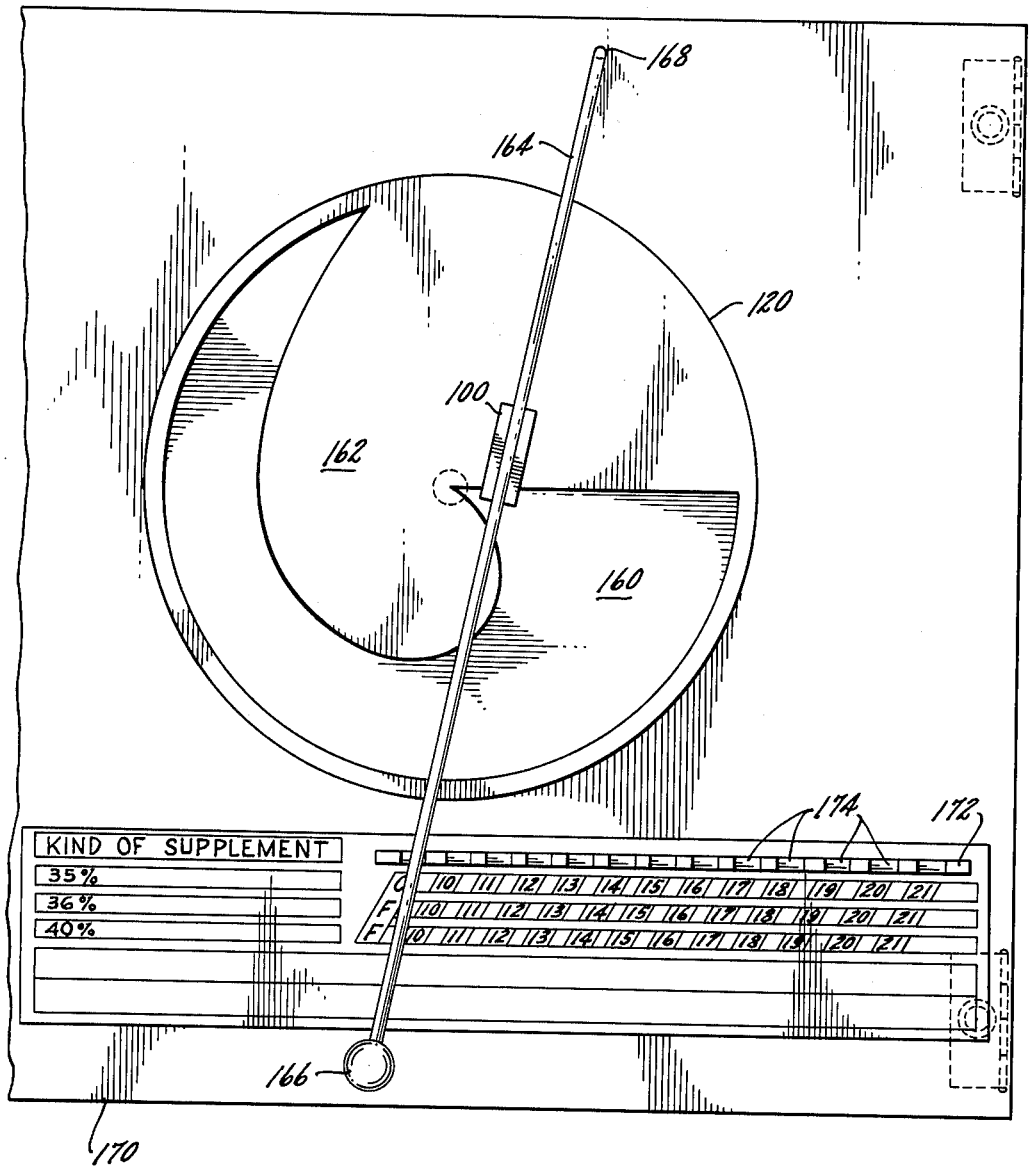
Figure 9:
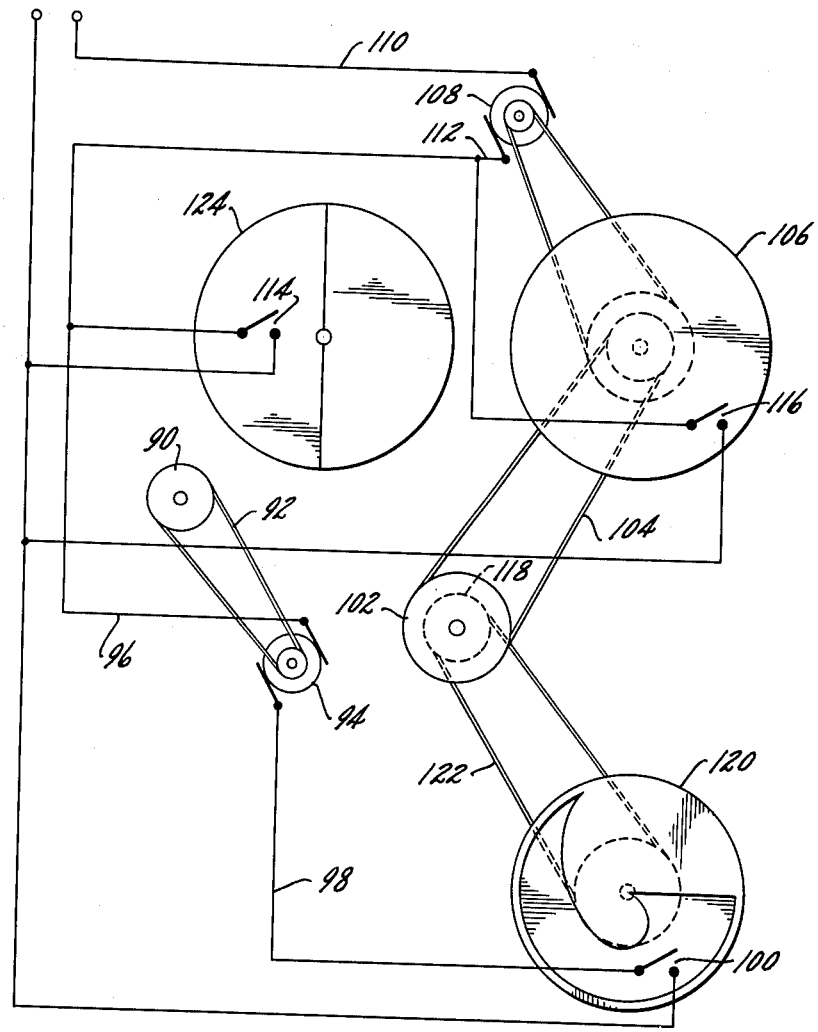
Figure 10:
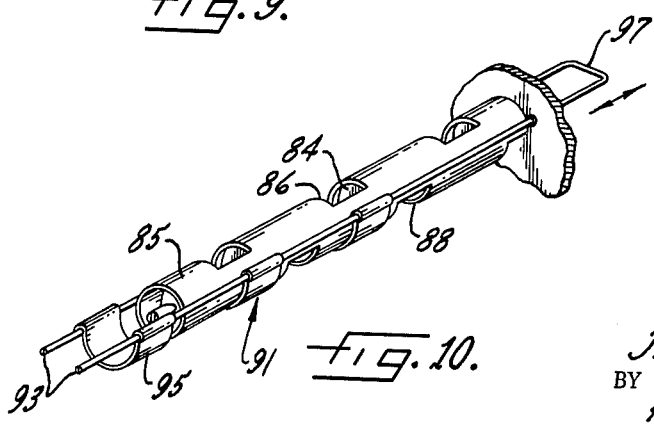

The invention is illustrated diagrammatically in the following drawings wherein:

FIGURE 1 is a diagrammatic illustration of a feed pen of the type described arranged for winter fattening, FIGURE 2 is a perspective, similar to FIGURE 1, showing the feed pen arranged for summer fattening, FIGURE 3 is a perspective, on an enlarged scale, illustrating the feeder, FIGURE 4 is a vertical section through the feeder illustrated in FIGURE 3, FIGURE 5 is a section along plane 5—5 of FIGURE 4, FIGURE 6 is a perspective illustrating the feed augers and the connection therebetween, FIGURE 7 is an enlarged plan view of the control means for the grain feed auger, FIGURE 8 is an enlarged plan view of the control means for the feed supplement auger, FIGURE 9 is a wiring diagram illustrating the controls for the feed augers, and FIGURE 10 is a perspective of a control sleeve for the feed augers.

In FIGURE 1, an animal feeding pen, preferably for swine or hogs, is indicated generally at 10 and includes an exercise area 12 and a feeding area 14. The pen 10 may include a slatted floor 16 supported by frame members 18 and 20 and held in a raised position by adjustable legs or the like 22. As shown herein, the pen is portable and is supported on skids or runners 24. A fence or the like 26 may surround the exercise area 12 and there may be a gate 28 which can be used as an entrance ramp.

The feeding area 14 may be enclosed by a housing or house 30 having a slanted front wall 32, a roof 34 and sidewalls 36. When the feeding area 14 is arranged for farrowing, there will be stalls set up within the enclosure 30 to isolate the sows. The feeding area 14 may also be supported on legs 38 and on runners or skids 40. A feeder is indicated generally at 42.

The arrangement of FIGURE 1 is suitable for winter fattening. When the hogs are being fed they are within the enclosure. FIGURE 2 shows the same structure arranged for summer fattening. The exercise area 12 and the feeding area 14 are reversed in position relative to the feeder 42. In this case the hogs will feed in the open rather than in the enclosure. As illustrated in FIGURE 2, there may be a watering trough 44 attached to one side of the exercise area 12. The enclosure 30 may have windows or vents indicated at 46 and 48 for providing ventilation. Adjacent the entrance ramp 50 there may be a urine trap 52 which is positioned above a chamber pot 54 which will collect the manure for later use as fertilizer.

As shown herein, the skids 24 and 40 are integral, but in some applications there may be separate skids for the exercise area and for the feeding or enclosed area. What is important is that the entire feeding pen be portable and capable of quick dismantling. As shown herein, both in the winter fattening arrangement and in the summer fattening arrangement, there is no provision for farrowing. It should be understood that the addition of stalls in the enclosure 30 will provide for farrowing.

The feeder 42 is illustrated in detail in FIGURE 3 and may include a housing 56 having a trough or the like 58 along the bottom, the trough conventionally being available to animals within the pen. The floor or bottom 60 of the trough may have a heating coil or electrical tape indicated at 62 to provide heat for the brooding of pigs. At the center of the trough 58 there may be a watering arrangement 64, similar to the watering trough 44 illustrated in FIGURE 2. The watering trough 64 may also be heated, although this is not necessary.

FIGURE 4 is a vertical section through the feeder 42. Within the housing 56 is a first hopper 66 which may contain feed supplements for adding protein, various types of medicine, etc., to the basic grain diet of the hogs. The hopper 66 may have sidewalls 68 and 70 and a plurality of bottom openings or passages 72. Positioned at the bottom of the hopper 66 is an auger 74. The auger 74 is enclosed in a sleeve or the like 75 and is effective to take the feed supplement from openings 72 and deliver it to openings 76 formed at the head of passages 78. The passages or conduits 78 are clearly shown in FIGURE 6.

Also within the housing 56 is a second hopper 80 which holds the basic grain feed for the hogs. The hopper 80 is formed by wall 70 and by an outer wall 82 of the housing 56. At the bottom of hopper 80 is a second auger 84, enclosed in a sleeve 85, which receives the feed supplement from conduits 78 and the grain from the hopper 80 through openings 86. Auger 84 is effective to drop the combination of feed supplement and grain through openings 88 into trough 58. A control sleeve is indicated generally at 91 and may be formed by spaced rods 93 mounting sleeve sections 95. The control sleeve may be slid back and forth by handle 97 to control the feed supply. Note that there is one less sleeve section 95 than there are openings 88 so that the feed will never be completely blocked when the auger is turning. The speed of the auger and the time during which it operates as well as the position of control sleeve 91 will control the volume of feed or the ration. The auger 74 takes controlled amounts of the feed supplement and passes it to auger 84. Auger 84 then takes controlled amounts of the feed supplement and of the grain from hopper 80 and mixes this material together and distributes it into the feed trough 58.

FIGURE 9 illustrates the overall drive system for the augers. Auger 74 is driven from a sheave 90 which in turn is rotated by belt or the like 92 driven by drive motor 94. Electrical power for drive motor 94 is provided by line 96 and by a second line 98. Line 98 is closed by a switch or microswitch 100 as described hereinafter. The grain auger or auger 84 is driven by a sheave 102 through a belt 104 from a weight disc 106. A motor 108 drives the weight disc and the motor 108 receives its electrical power through line 110 and line 112. The circuit to motor 108 is not completed until either microswitch 114 or microswitch 116 is closed. Auger 84 also carries a second sheave 118 which drives a feed supplement control disc 120 through a belt or the like 122.

The day-night or 24-hour clock and the weight disc 106 are illustrated in detail in FIGURE 7. The 24-hour clock or day-night clock includes a rotatable disc 124 driven in a suitable manner from a conventional clock drive. The disc 124 includes a night section 126, which is blank as generally feeding is not preferred at night, and a day section 128 having numerous holes or openings 130 arranged in a predetermined manner. The holes 130 are arranged in concentric circles with the number of openings or holes in each circle decreasing from the outside of the disc toward the center. For example, the outside circle may have ten holes 130, the next circle nine, and so forth, until the circle closest to the center of the disc 124 has only a single opening or hole. The number of holes in any particular circle determines the number of feeding periods in a twelve-hour interval. An arm 132 may be pivotally mounted in a plate 134 supporting disc 124. The arm 132 carries a sliding bracket 136 which mounts microswitch 114. Whenever a hole or opening 130 is directly below the microswitch, its contacts will drop into the hole and close. The arm 132 may have a handle or operating knob 138 which extends to a position for adjustment by the operator. This is illustrated in FIGURE 3. The operator determines how many feeding periods he wishes during the day and sets the arm 132 to a position such that the microswitch will close that number of times during a twelve-hour period.

Adjacent the clock disc 124 is weight disc 106 which is also mounted on plate 134. The weight disc 106 has numerous openings or holes 140 which are arranged in concentric circles with the number of openings in each circle decreasing toward the center. For example, the outer circle may have ten openings, the next circle nine, etc. Adjacent disc 106 is a fixed arm 142 which mounts a slideable arm 144. Microswitch 116 is mounted on slideable arm 144 and the position of the microswitch relative to the concentric circles or openings 140 is determined by the position of arm 144. An arm 146, pivoted at 143, is connected by a spring or the like 148 to one portion of arm 142. Mounted on arm 146 are a pair of latch members 150 which are urged by springs 152 into contact with teeth or the like 154 formed on arm 144. One end of arm 146 mounts a cam follower 156 which may ride on the outer surface of disc 124. The cam follower 156 will dip into can opening 158 once every 24 hours. When this occurs, arm 144 will be slid in an upward direction, as shown herein, to change the position of the microswitch 116 relative to the concentric circles of openings 140. Microswitch 116 is at its initial position as illustrated in FIGURE 7. As the switch moves upward the amount of grain provided at each feeding interval will increase as the distance between openings 140 in a particular concentric ring increases.

FIGURE 8 illustrates the control disc 120 for determining the amount of feed supplement that is added to the basic grain ration. The disc 120 may include a raised section 160 and a cavity or recess 162. Microswitch 100 is mounted on an arm 164 having a control handle 166 at one end and pivotally mounted, as at 168, to a plate 170. At the bottom of FIGURE 8 is a bar 172 having a plurality of openings 174, with each opening being designed to provide a different amount of feed supplement. The arm 164 may be positioned in any one of openings 174, as determined by the operator, and this will fix the amount of feed supplement that is added to the grain. Suitable proportioning information may be placed below bar 172 to provide the operator with a quick indication of how much supplement is being added. Microswitch 100 will be closed whenever it is positioned above the raised section 160. The particular shape of the raised section 160, and as shown herein it is somewhat spiral, will determine the length of time that the microswitch is closed during one revolution of the disc 120, which will determine the length of time that the feed supplement auger will be operated.

Returning to FIGURE 3, the discs and controls described above and illustrated in detail in FIGURES 7, 8 and 9, are positioned within a housing 176 on one end of the feeder 42. The control arms 138 and 166 are available to an operator on the side of the feeder.

The operation of the feeder is automatic and is controlled by the day-night clock illustrated in FIGURE 7. Whenever switch 114 closes, the circuit to motor 108 is completed and this motor will drive the weight disc 106. This circuit will only be closed for a short period of time as disc 124 is continuously moving. However, movement of weight disc 106 will remove switch contacts 116 from an opening 140 to close the switch. The closure of switch 116 will lock in motor 108 to continue rotation of disc 106. The initiation of the feeding cycle is caused by the day-night clock, but switch 116 takes over control of the weight disc and continues its rotation. Disc 106 will continue to rotate until the next opening in that particular concentric circle on the disc is reached. At that time switch 116 will open and motor 108 will shut off. In the meantime, while disc 106 is rotating, auger 84 will be driven and when this auger is driven, it will drive disc 120. As soon as switch 100 is closed by disc 120, the circuit to motor 94 is completed, and auger 74 will rotate. The feed supplement auger will only rotate when the grain auger is rotating. The relative speed between the feed supplement auger and the grain auger can be controlled so that a predetermined dosage of supplement is added to a predetermined amount of grain. The relative speed between the two augers can easily be controlled by various gearing arrangements. The time during which the feed supplement auger is rotating also controlled by the position of microswitch 100 relative to the raised area on the disc 120. Microswitch 100 is only closed when it is over the raised area on disc 120.

The use, operation and function of the invention are as follows:

The combination feed pen and feeder shown may be used for either fattening or farrowing hogs or swine. The particular feed pen shown is advantageous in that it is portable and can be easily changed for either summer or winter fattening. The feeder is completely automatic and will provide predetermined amounts of grain and feed supplements at set intervals during the day. There may or may not be feeding at night. The number of feed intervals can be programed and the system can be arranged to gradually increase the feed ration per feeding over a given number of days. Once the maximum ration per interval is reached, it stays constant. Not only can the number of feeding periods and the amount of feed be varied, but the amount of feed supplement added to the basic grain feed can also be varied. The feed supplements may include protein, various types of medicine, or other supplements. As shown herein, there is only a single hopper for adding these supplements. It should be realized that additional hoppers may also be used to add different types of feed supplements where they cannot all be mixed in a single hopper. The only controls necessary for adjustment by the farmer or hog raiser are the amount of feed supplement added to each batch of grain, and the number of basic feeding periods per day.

The feed pen may include weight cells to monitor the increase in weight of the hogs. The weight cell information may be placed on a control tape of a suitable type for future reference and study or it may be used to regulate the ration and proportion of supplement or concentrate.

The feeder may be divided into two or more sections, with one section utilized as a pig starter and the other section to feed sows. The amounts and types of feeds will then vary from one section to another.

Of advantage in the feed pen, above its portability, is that there is no requirement for bedding. The enclosure may have temperature controls to provide natural nonchilling quarters for sleeping. Waste disposal is no problem and the pen can easily be kept in a sanitary condition. The ease of assembly and disassembly and the elimination of ground contact isolates the animals from contaminated areas, thus cutting down on disease.

Whereas the preferred form of the invention has been shown and described herein, it should be realized that there are many modifications, substitutions and alterations thereto within the scope of the following claims.

I claim:

1. In an animal feeder, a housing, an open trough in said housing, a feed supplement hopper in said housing, a grain hopper in said housing, passage means between said grain hopper and said trough, a first auger in said passage means for moving grain to said trough, passage means between said feed supplement hopper and said first auger, a second auger in the passage means between said feed supplement hopper and said first auger for moving feed supplement to said first auger, drive means for said augers and timing means for said drive means to operate the second auger only during selected operating periods of said first auger to provide an intimately mixed combination of grain and feed supplement to said trough at predetermined intervals.

2. The structure of claim 1 further characterized in that the drive means for said augers includes a motor for driving said first auger and a motor for driving said second auger, said timing means being effective to start the motor for said first auger at predetermined set intervals.

3. The structure of claim 2 further characterized by and including means for operating the drive motor for the second auger when the drive motor for the first auger is operating.

4. The structure of claim 3 further characterized by and including means for adjusting the period during which the motor for the second auger operates relative to the operation of the motor for the first auger.

5. The structure of claim 1 further characterized in that said timing means includes a 24-hour clock, and means for varying the number of operating periods of the augers during each 24 hours of the day.

6. The structure of claim 5 further characterized in that said clock includes a rotatable plate having a number of openings, said openings being arranged in concentric circles, the number of openings in each concentric circle varying, and an arm having electrical switch contacts positioned to drop into one of said openings, said electrical switch contacts being effective to cause operation of the drive means for said augers.

7. The structure of claim 1 further characterized by and including means for varying the amount of grain fed by the first auger.

8. The structure of claim 7 further characterized by and including a drive motor for said first auger, a rotatable plate driven by said drive motor, said plate having a plurality of openings arranged in concentric circles, with the number of openings in each circle varying from the number of openings in the other circles, a pivotal arm adjacent said plate, and electrical switch contacts on said arm positioned to drop into said openings, said contacts being effective to control operation of the drive motor for said first auger.

9. The structure of claim 8 further characterized by and including means for periodically and automatically varying the position of said arm above said rotatable disc to vary the ring of openings positioned to receive said electrical switch contacts.

References Cited by the Examiner

UNITED STATES PATENTS

| | | | |
|---|---|---|---|
| 2,043,595 | 6/1936 | Raymond | 119—51.11 |
| 2,794,576 | 6/1957 | Reynolds | 119—53 X |
| 2,841,115 | 7/1958 | Weber | 119—52 |
| 3,011,475 | 12/1961 | Golay | 19—20 |
| 3,026,845 | 3/1962 | Winter | 119—51.11 |
| 3,042,000 | 7/1962 | McMurray et al. | 119—20 |
| 3,119,526 | 1/1964 | Sutton | 119—51.11 X |
| 3,125,991 | 3/1964 | Van Dusen | 119—56 |

SAMUEL KOREN, *Primary Examiner.*

HUGH R. CHAMBLEE, *Examiner.*